United States Patent
Wiedenberg et al.

(10) Patent No.: US 7,656,896 B2
(45) Date of Patent: Feb. 2, 2010

(54) AUTOMATION SYSTEM WITH SIMPLIFIED DIAGNOSIS AND RECTIFICATION OF ERRORS

(75) Inventors: Peter Wiedenberg, Feucht (DE); Rene Wolf, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 423 days.

(21) Appl. No.: 10/555,799

(22) PCT Filed: Apr. 2, 2004

(86) PCT No.: PCT/EP2004/003534

§ 371 (c)(1),
(2), (4) Date: Nov. 3, 2005

(87) PCT Pub. No.: WO2004/100488

PCT Pub. Date: Nov. 18, 2004

(65) Prior Publication Data

US 2007/0043532 A1     Feb. 22, 2007

(30) Foreign Application Priority Data

May 7, 2003     (DE) .............................. 203 07 101 U

(51) Int. Cl.
*H04J 3/16* (2006.01)
*G06F 15/16* (2006.01)
(52) U.S. Cl. ..................................... 370/466; 709/217
(58) Field of Classification Search ........................ None
See application file for complete search history.

(56) References Cited

U.S. PATENT DOCUMENTS

| 4,943,919 A * | 7/1990 | Aslin et al. ..................... 701/3 |
| 6,112,246 A | 8/2000 | Horbal et al. |
| 6,701,285 B2 | 3/2004 | Salonen |
| 7,085,938 B1 * | 8/2006 | Pozzuoli et al. ............. 713/300 |
| 2002/0095644 A1 | 7/2002 | Weiss |
| 2002/0120671 A1 | 8/2002 | Daffner et al. |
| 2003/0009313 A1 * | 1/2003 | May et al. ................... 702/188 |
| 2003/0200323 A1 * | 10/2003 | Dold et al. ................... 709/230 |
| 2003/0236649 A1 * | 12/2003 | Kodukula et al. ........... 702/188 |
| 2004/0254910 A1 * | 12/2004 | Tiegelkamp ................... 707/1 |
| 2007/0061451 A1 * | 3/2007 | Villado et al. ............... 709/224 |

FOREIGN PATENT DOCUMENTS

| EP | 0 964 325 A1 | 12/1999 |
| WO | WO 01/50704 A2 | 7/2001 |

* cited by examiner

*Primary Examiner*—Andrew Lee

(57) ABSTRACT

One embodiment relates to an automatic system comprising a plurality of subscribers which are connected to a common communication channel, whereby each of the subscribers automatically provides the diagnosis information associated therewith on the communication channel, another conversion station is connected to the communication channel and comprises a web server which converts the diagnosis information available in the communication channel into a single web-enabled format, the conversion station is connected to a service station via a network and the service station has a web browser and a display connected to the web browser, whereby the web browser converts the diagnosis information transmitted via the network into a single display format and the display is provided in order to display diagnosis information provided by the web browser.

20 Claims, 1 Drawing Sheet

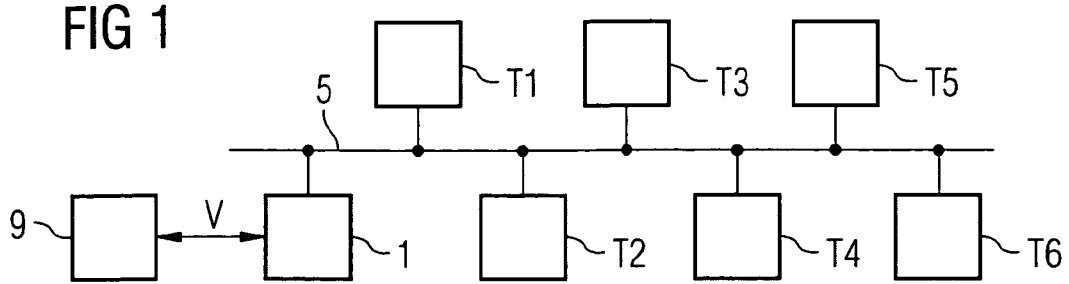
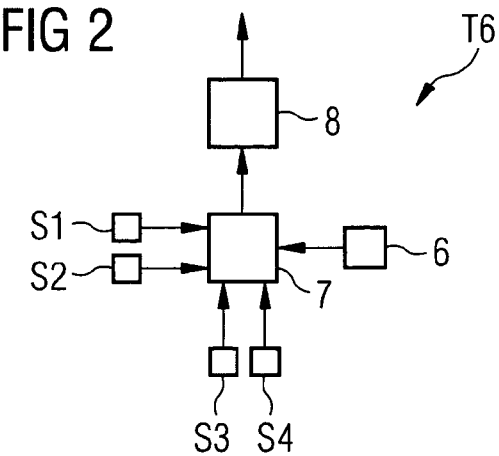
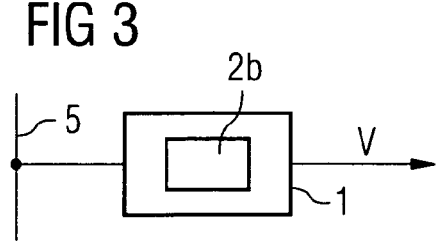
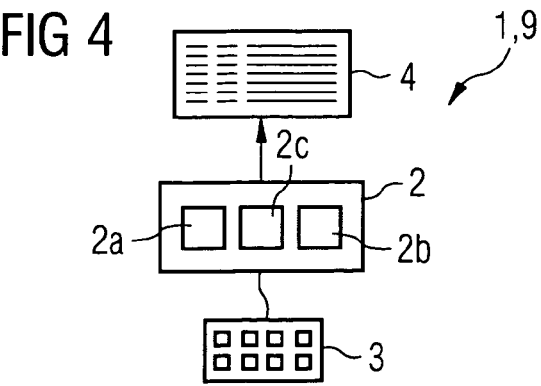

US 7,656,896 B2

AUTOMATION SYSTEM WITH SIMPLIFIED DIAGNOSIS AND RECTIFICATION OF ERRORS

CROSS REFERENCE TO RELATED APPLICATIONS

This application is the US National Stage of International Application No. PCT/EP2004/003534, filed Apr. 2, 2004 and claims the benefit thereof. The International Application claims the benefits of German application No. 20307101.8 DE filed May 7, 2003, both of the applications are incorporated by reference herein in their entirety.

FIELD OF INVENTION

The invention relates to an automation system with simplified diagnosis and rectification of errors.

BACKGROUND OF INVENTION

Automation systems featuring a plurality of subscribers which are connected to a common communication channel are already known.

Furthermore the manual creation and storage of diagnostic information within the framework of project planning for the system is already known as regards the subscribers of these types of automation systems. This manual creation of the diagnostic information is very time-consuming. Any errors detected are rectified locally using programs which depend on the subscriber concerned.

A device and a method for data communication are known from US 2002/0120671, especially for parametrization and remote supervision of heating plants. With this known device a plurality of subscribers are connected to a common bus. The bus subscribers can transmit messages for diagnostic purposes. A protocol converter is also connected to the bus which is connected via a modem to the Internet. Furthermore a system computer which features a database is connected via a further modem to the Internet. If an error occurs in one of the subscribers the occurrence of this error is notified via the Internet and/or another data connection to the operator.

A system and a method for accessing information of a remotely arranged device and for transmission of this information to a client workstation are known from U.S. Pat. No. 6,112,246 A. In this known method a micro server is integrated in each case into the subscriber connected via a bus or the Ethernet which allows access to the data of the subscriber, using Web pages for example. The data of the subscriber is transmitted on demand or cyclically to a remotely arranged client. The micro server converts the data of the relevant subscriber such that it corresponds to a communication protocol.

A method is known from EP 0964 325 A1 in which diagnostic data of plug-in devices of a process automation system is collected via a field communication interface using a field communication protocol. Furthermore status data of the field devices is transmitted to another application of the automation system, for example to the control room software or management software. This occurs independently of the type of field device.

A Web-based tool check in conjunction with semiconductor fabrication is known from US 2002/0095644 A1. The invention described there discloses a system for connection of semiconductor fabrication tools using a data network and a microprocessor-based interface which is assigned to each process tool. The data network and the Interface look after communication in accordance with known standards over Intranet or Internet connections to one or more remotely arranged browsers. The data arising during the process is available in realtime on the network and can be retrieved by an operator at any point of the network.

SUMMARY OF INVENTION

An object of the invention is to specify an automation system in which the disadvantages of the known systems do not occur.

This object is achieved by an automation system with the features specified in an independent claim. Advantageous embodiments and developments of the invention are produced by the dependent claims.

The advantages of invention are to be found especially in the fact that, through the automatic provision of diagnostic information on the part of each subscriber, especially also on the part of each subscriber newly connected to the system, a service station connected to the automation system via any given network, especially via the Internet or an Intranet, can obtain a rapid and simple overview of all available diagnostic data of the subscriber and where necessary can transmit error rectification information back to the automation system. Since the diagnostic data which relates to the individual system subscribers is present in a single format, the overview of the available diagnostic data is particularly easy to understand. These advantages are achieved especially in that the diagnostic information of the subscribers is automatically provided in a singe standard format or in an interpretable format and that the conversion station converts the transmitted diagnostic data independently of the relevant source of the diagnostic information be means of a Web server into a single format which is suitable for transmission over the available network to the service station.

Preferably the diagnostic information is initially converted into a standard format, which in this case is the XML format. The XML (Extensible Markup Language) format corresponds to a meta language which describes text-based data to be transmitted. This meta language was originally created for the purpose of structuring documents in a simple way since it is advantageous for structured data to be available when data is exchanged. This XML format which is known per se is used advantageously in the present invention to make available in an automation system diagnostic data of the individual subscribers of the system in a single format. The diagnostic information available in the XML format is then converted by means of a Web server into signals suitable for transmission over a network.

An automation system has the advantage that the service station, immediately after a subscriber is newly connected to the automation system, automatically obtains knowledge about the new subscriber and is also given information about its identity. There is no need for a new subscriber to be registered or configured manually.

A presentation of the diagnostic information shown in the display in the form of a graphical representation or of a list enhances clarity for the operator in relation to the diagnostic information provided by the subscribers.

A presentation of the diagnostic information shown on the display in which diagnostic information pertaining to different subscribers is shown in a uniform display format, further enhances the clarity of the diagnostic information made available by the subscribers.

An advantage lies in the fact that subscriber devices originating from different manufacturers can be connected to the common communication channel yet in such cases the uniformity of the display presentation of the diagnostic information is still retained.

If the subscribers connected to the communication channel make their diagnostic information constantly available, then the service station has permanent access to the diagnostic data of all subscribers connected to the communication channel.

The conversion station may be advantageously implemented in the form of a notebook. A portable device of this type can be connected to the common communication channel at any point of the automation system of which the subscribers can be widely dispersed over various locations. The desired overview of the diagnostic information of all subscribers is available at all access points of the common communication channel.

A selection can advantageously be made, on the basis of which only diagnostic information pertaining to selected subscribers will be shown on the display. For example the selection can consist of showing on the display only the diagnostic information pertaining to the controllers contained in the automation system or only the diagnostic information pertaining to the vessels contained in the automation system. Especially where the number of subscribers of the automation system is large, this further enhances the clarity for diagnostic information required at a particular time.

An advantage of the operation unit lies in the fact that the operator can specify selection criteria himself. This is for example of advantage if it transpires within the course of a process that one or more specific subscribers are especially susceptible to errors and therefore have to be constantly observed.

BRIEF DESCRIPTION OF THE DRAWINGS

Further advantageous features of the invention are produced by explaining examples of them with reference to the figures. The figures show:

FIG. 1 a block diagram of an automation system,

FIG. 2 a block diagram of a subscriber of the automation system shown in FIG. 1, FIG. 3 a block diagram of a first exemplary embodiment for the conversion station 1 of FIG. 1, and FIG. 4 a block diagram of a second exemplary embodiment for the conversion station 1 of FIG. 1 and also of an exemplary embodiment for the service station 9 of FIG. 1.

DETAILED DESCRIPTION OF INVENTION

FIG. 1 shows a block diagram of an automation system. This features subscribers T1, T2, T3, T4, T5 and T6 who are connected to a common communication channel 5. Said subscribers can be arranged at widely dispersed locations. These subscribers for example include the controllers, vessels, valves and robots of an industrial plant which is intended for manufacturing a product. Furthermore a conversion station 1 is connected to the communication channel 5. This conversion station can be arranged in a control center of the automation system. As an alternative or in addition to this, a conversion station can also be a portable device, for example a notebook computer, which can be connected to the communication channel 5 at any point along it. The common communication channel 5 in this case is the Ethernet (LAN/WAN) or a bus, via which the subscribers T1, . . . , T6 and the conversion station 1 are interconnected. The diagnostic information pertaining to the individual users is constantly available on this communication channel, so that the conversion station 1 has ongoing access to all diagnostic information of the system. The conversion station 1 is connected via a network V to a service station 9. The network concerned is in particular the Internet or an Intranet. It is assumed below that the network V is the Internet, so that the conversion station 1 is connected via an Internet connection to the service station 9.

Each subscriber connected to the communication channel makes their diagnostic information available independently and automatically. In accordance with a first embodiment the diagnostic information made available by the subscribers has one and the same standard format. This applies regardless of the manufacturer which produced the relevant subscriber device. As a consequence the invention enables subscribers of different manufacturers to be used in one and the same automation system, provided all these subscribers are using the single standard format to supply the diagnostic information which they make available.

This single standard format preferably involves the XML format. This corresponds to a meta language which provides a text-based description of data to be transmitted. This meta language which was originally created for the purpose of structuring documents in a simple way is used in this first embodiment of the invention to make available diagnostic information in a single format on the communication channel 5 of an automation system.

The diagnostic information provided by the subscribers on the communication channel is converted in the conversion station 1, using a Web server, into a format in which the diagnostic information can be transmitted over the Internet.

FIG. 2 shows a block diagram of the subscriber T6 of the automation system shown in FIG. 1. Subscriber T6 has a memory 6, in which signals are stored which identify the subscriber. These identification signals include specifications about the type of subscriber, information about technical data of the subscriber and information about the manufacturer of the subscriber. Subscriber T6 further has a control unit 7 which has access to the data stored in the memory 6. The control unit 7 is also fed sensor signals generated by sensors S1, S2, S3 and S4. These contain information about the status of individual components of subscriber T6. The control unit 7 combines the identification signals read from the memory 6 and the sensor signals obtained from the sensors into diagnostic information pertaining to subscriber T6 and routes this information to the converter, preferably an XML editor 8. This converts the signals delivered by the control unit 7 into the XML format and makes the diagnostic information in the XML format available to the communication channel 5.

The further subscribers T1, . . . , T5 are structured in a similar way to subscriber T6. In particular each of these subscribers also has an XML editor which makes available the diagnostic information of the relevant subscriber to the communication channel 5 in XML format.

FIG. 3 shows a block diagram of a first exemplary embodiment for the conversion station 1 of FIG. 1. In this first exemplary embodiment the conversion station 1 essentially has the task of using a Web server 2b to convert the diagnostic information provided by subscribers T1, . . . , T6 in the XML format into a format which is suitable for an Internet transmission. The output signals of the Web server 2b of the conversion station 1 are transmitted over the Internet connection V to the service station 9.

In the service station 9 it is determined for example, within the framework of the process diagnosis on occurrence of an error, why a position relating to one of the robots is not being reached. The display of the diagnostic information allows a service specialist sitting at the screen of the service station to localize the cause of the error and suggest possible remedies.

As an alternative it is also possible to output error rectification data automatically and transmit it over the Internet connection 9 and the communication channel 5 to the incorrectly operating subscriber.

FIG. 4 shows a block diagram of a second exemplary embodiment for the conversion station 1 of FIG. 1. This same embodiment can also feature the service station 9. In accordance with FIG. 4 the conversion station features an operator keyboard 3, a central processing unit 2 and a display 4. The diagnostic information made available by the subscribers is shown on the display 4.

The diagnostic information present on the communication channel 5 in XML format is fed to the central processing unit 2. This features a Web server 2b of which the task is to convert the diagnostic information present in the XML format independent of the manufacturer of the subscriber concerned into a single format which is suitable for transmitting the diagnostic information over the Internet. A Web browser is connected to the output of Web server 2b which converts the signals generated by the Web server into a uniform display format for the display 4.

The diagnostic information obtained from the output of the Web server 2b transmitted over the Internet connection V is fed in the service station 9 to the Web browser provided there and converted in this browser into a uniform display format for the display of the service station. The service information is presented here in the form of a list. For example an individual display line in the list is assigned to each subscriber. As a result, line 1 of the list displays the diagnostic information of a first faulty subscriber. Line 2 of the list displays the diagnostic information of a second faulty subscriber etc. Within each line of the display different areas are provided, with a sequence number being shown in a first area, a subscriber identification in a second area and information about the status of the subscriber in a third area. The information about the status of the subscriber can be an alarm signal, an error message or a message about a fault-free status.

If a subscriber is newly connected to communication channel 5, it immediately and automatically provides the communication channel 5 with diagnostic information which is available in the XML format and contains identification signals identifying the newly connected subscriber. These identification signals include information about the manufacturer of the subscriber and information about the type of the subscriber.

As an alternative to showing the diagnostic information in the form of a list the diagnostic information can also be shown in the form of a graphical presentation. If plant hierarchies are known for example, a fully graphical presentation (main nodes, subnodes, graphics, etc.) could be created automatically.

In the automation system described here the conversion station 1 and the service station 9 are consequently provided with all available diagnostic data of the connected subscribers. The conversion station and the service station 9 can as a result access this data at any given point in time and if necessary provide error rectification data, which is made available in an error rectification component 2c as a reaction to the transmitted diagnostic information. The error rectification data can be data by means of which an update of the software of a subscriber is undertaken, control commands which influence the relevant control elements in the subscriber, or configuration data.

An advantageous further development of the invention consists of equipping the central processing unit 2 of the conversion station 1 and the service station 9 each with a further selection component 2a which can be a software package. By means of this selection component a selection can be made from all connected subscribers, on the basis of which only the diagnostic information pertaining to the selected subscriber will be shown on the display. For example there is the option of having only all diagnostic information which originates from the vessel of the overall system displayed, or of only having diagnostic information displayed which originates from the controllers of the automation system.

Preferably the service station 9 and the conversion station 1 each feature an operating unit 3 by means of which the operator can specify selection criteria. If for example it is detected in the course of a process that specific subscribers of the automation system get into critical conditions more often and for this reason have to be permanently monitored, a selection of these subscribers can be programmed by entering corresponding selection criteria by means of the operation unit 3.

Moreover an automation system with simplified diagnosis and rectification of errors is provided by the invention. Diagnostic information of the subscribers of the system is available throughout the plant in unified form. This information is accessed via a Web server. The diagnostic information is available via a network (Internet, Intranet) to a service station. The service station can be located wherever and access to the network is provided. Consequently when faults arise it is in many cases not necessary to have service specialist travel to the installation site of the faulty subscriber. The service specialist can use the diagnostic information transmitted over the network even for remote detection of error locations and error causes and can also propose possible ways of rectifying errors.

An advantageous embodiment of the invention consists of equipping both the service station 9 and also the conversion station 1 with a display and of monitoring the diagnostic information made available by the subscriber both locally by means of the conversion station and also in the service station and where possible to put in train an error rectification both locally and also remotely.

An alternative embodiment of the invention consists of not converting the diagnostic information supplied by the subscriber into XML format in the subscriber itself, but only in the conversion station.

The invention claimed is:

1. An automation system, comprising:
   a subscriber connected to a communication channel of the automation system;
   a subscriber diagnostic information generated by the subscriber and provided to the communication channel;
   a conversion station having a Web server that converts the subscriber diagnostic information present on the communication channel into a Web-enabled format, the converted subscriber diagnostic information transmitted over a network;
   a service station operatively connected to a conversion station via the network receives the converted subscriber diagnostic information, the service station including a Web browser connected to a display, the Web browser converting the converted subscriber diagnostic information into a display format; and
   an error rectification component that after receiving the subscriber diagnostic information automatically generates and provides an error rectification data back to the automation system.

2. The automation system according to claim 1, wherein the service station includes the error rectification component or the conversion station includes the error rectification component or the service station includes a first error rectification component and the conversion station includes a second error rectification component.

3. The automation system according to claim 2, wherein a converter converts the subscriber diagnostic information to a standard format, the subscriber includes the converter or the converter station includes the converter or the subscriber includes a first converter and the converter station includes a second converter.

4. The automation system according to claim 3, wherein standard format is an XML format.

5. The automation system according to claim 2, wherein after a connection of the subscriber to the communication channel, the subscriber automatically provides to the communication channel the subscriber diagnostic information having identifying signals that identify the newly connected subscriber.

6. The automation system according to claim 5, wherein the display format is a list or a graphical representation.

7. The automation system according to claim 6, wherein the display format is the same for a plurality of subscribers.

8. The automation system according to claim 7, wherein at least one of the plurality of subscribers has a different manufacturer and the display format is the same regardless of manufacturer.

9. The automation system according to claim 1, subscriber diagnostic information is available to the communication channel allowing the conversion station to have ongoing access to the subscriber diagnostic data for the subscriber connected to the communication channel.

10. The automation system according to claim 1, wherein the conversion station includes a display connected to the Web server via a Web browser, the display is used to show the subscriber diagnostic information provided by the Web browser.

11. The automation system according to claim 7, wherein the service station and/or the conversion station includes a selection component to select the subscriber diagnostic information to display from the plurality of subscribers.

12. The automation system according to claim 11, wherein the service station and/or the conversion station includes an operation unit for input of selection criteria.

13. The automation system according to claim 1, wherein the service station includes the error rectification component, which provides error rectification that is transmitted via the network and communication channel to the subscriber.

14. The automation system according to claim 1, wherein the error rectification data is transmitted from the conversion station to the subscriber via the communication channel 15. The automation system according to claim 14, wherein the error rectification data includes software data.

16. The automation system according to claim 15, wherein the error rectification data includes control command.

17. The automation system according to claim 15, wherein the error rectification data includes configuration data.

18. The automation system according to claim 1, wherein the network is the Internet or an Intranet.

19. An automation system, comprising:

a subscriber connected to a communication channel of the automation system, wherein at least one of the plurality of subscribers has a different manufacturer;

a subscriber diagnostic information generated by the subscriber and provided to the communication channel;

a conversion station having Web server that converts the subscriber diagnostic information present on the communication channel into a Web-enabled format, the converted subscriber diagnostic information transmitted over a network;

a service station operatively connected to a conversion station via the network receives the converted subscriber diagnostic information, the service station including a Web browser connected to a display, the Web browser converting the converted subscriber diagnostic information into a display format; and an error rectification component that after receiving the subscriber diagnostic information automatically generates and provides an error rectification data back to the automation system.

20. The automation system according to claim 19, wherein the error rectification data is transmitted from the conversion station to the subscriber via the communication channel, wherein the error rectification data includes a control command and configuration data.

* * * * *

UNITED STATES PATENT AND TRADEMARK OFFICE
CERTIFICATE OF CORRECTION

| | |
|---|---|
| PATENT NO. | : 7,656,896 B2 |
| APPLICATION NO. | : 10/555799 |
| DATED | : February 2, 2010 |
| INVENTOR(S) | : Wiedenberg et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 539 days.

Signed and Sealed this

Thirtieth Day of November, 2010

David J. Kappos
*Director of the United States Patent and Trademark Office*